US010949045B2

(12) United States Patent
Wang et al.

(10) Patent No.: US 10,949,045 B2
(45) Date of Patent: Mar. 16, 2021

(54) FLEXIBLE TOUCH SUBSTRATE AND TOUCH DEVICE THAT HAVE REDUCED PARASITIC CAPACITANCE BETWEEN DIFFERENT SIGNAL LINES

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Qingpu Wang, Beijing (CN); Dacheng Deng, Beijing (CN); Haitao Liu, Beijing (CN); Taofeng Xie, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 28 days.

(21) Appl. No.: 16/445,948

(22) Filed: Jun. 19, 2019

(65) Prior Publication Data
US 2020/0033997 A1 Jan. 30, 2020

(30) Foreign Application Priority Data
Jul. 25, 2018 (CN) .......................... 201810827555.1

(51) Int. Cl.
*G06F 3/044* (2006.01)

(52) U.S. Cl.
CPC .. *G06F 3/0446* (2019.05); *G06F 2203/04102* (2013.01); *G06F 2203/04111* (2013.01)

(58) Field of Classification Search
CPC .. G06F 3/0443; G06F 3/0446; G06F 3/04164; G06F 2203/04111; G06F 2203/04102
See application file for complete search history.

(56) References Cited

U.S. PATENT DOCUMENTS

| 2012/0118613 | A1* | 5/2012 | Fan ......................... G06F 3/044 174/250 |
| 2012/0255850 | A1* | 10/2012 | Shimizu ................ G06F 3/0446 200/600 |
| 2018/0053810 | A1* | 2/2018 | Jin ....................... G06F 3/04164 |
| 2019/0294282 | A1* | 9/2019 | Dun ...................... G06F 3/0416 |
| 2020/0012364 | A1* | 1/2020 | Ye ......................... G06F 3/0443 |

* cited by examiner

*Primary Examiner* — Kwang-Su Yang
(74) *Attorney, Agent, or Firm* — Nath, Goldberg & Meyer; Joshua B. Goldberg

(57) ABSTRACT

A flexible touch substrate and a touch device including the flexible touch substrate are provided. The flexible touch substrate includes a plurality of sides. Each of at least one of the plurality of sides has notches at its both ends. Each of the notches has two edges whose extension directions cross each other, and the two edges of each of the notches have a same length.

14 Claims, 6 Drawing Sheets

A-A'

B-B'

C-C'

D-D'

E-E'

F-F'

FLEXIBLE TOUCH SUBSTRATE AND TOUCH DEVICE THAT HAVE REDUCED PARASITIC CAPACITANCE BETWEEN DIFFERENT SIGNAL LINES

CROSS-REFERENCE TO RELATED APPLICATIONS

The present application claims the priority of Chinese Patent Application No. 201810827555.1, filed on Jul. 25, 2018, the contents of which are incorporated herein in their entirety by reference.

TECHNICAL FIELD

The present disclosure relates to the field of touch-control technology, and in particular, relates to a flexible touch substrate and a touch device.

BACKGROUND

With the development of science and technology, flexible touch devices have come into human life. Currently, the touch function of each of the touch devices is usually provided on a light exit surface (e.g., the surface on which information is displayed by the touch device when it is operating normally) only. Therefore, it is desirable to increase a touch region of a touch device such that a user can interact with the touch device more agilely and more conveniently.

SUMMARY

Embodiments of the present disclosure provide a flexible touch substrate and a touch device.

An aspect of the present disclosure provide a flexible touch substrate, including a plurality of sides, wherein each of at least one of the plurality of sides has notches at its both ends, each of the notches has two edges whose extension directions cross each other, and the two edges of each of the notches have a same length.

In an embodiment, edges of two notches at both ends of a same one of the plurality of sides have a same length.

In an embodiment, the flexible touch substrate includes
a flexible substrate; and
a plurality of first electrodes and a plurality of second electrodes on the flexible substrate;
wherein the plurality of first electrodes extend in a first direction, the plurality of second electrodes extend in a second direction perpendicular to the first direction, the plurality of first electrodes are insulated from the plurality of second electrodes, and the first direction is perpendicular to the side whose both ends have the two notches, respectively;
in the second direction, a distance between an outer side of the outermost first electrode relative to each side of the flexible substrate and the side of the flexible substrate is smaller than a length of each of the edges of the notch at an end of the side of the flexible substrate; and
in the first direction, a distance between an outer side of the outermost second electrode relative to each side of the flexible substrate and the side of the flexible substrate is smaller than a length of each of the edges of the notch at an end of the side of the flexible substrate.

In an embodiment, the flexible touch substrate further includes a plurality of signal lines on the flexible substrate, wherein the plurality of signal lines include a plurality of first signal lines and a plurality of second signal lines, each of the plurality of first electrodes is connected to one of the plurality of first signal lines, each of the plurality of second electrodes is connected to one of the plurality of second signal lines, and the plurality of first signal lines are insulated from the plurality of second signal lines.

In an embodiment, a portion of the plurality of second signal lines are located between the first electrode at least partially overlapping at least one of the notches in the first direction and the first signal line corresponding to the first electrode, the first electrode at least partially overlapping at least one of the notches in the first direction and the corresponding first signal line are connected to each other through a first bridge connector, and the first bridge connector is insulated from the second signal line crossing the first bridge connector.

In an embodiment, each of the first electrodes includes a plurality of first electrode bodies arranged in the first direction, each of the second electrodes includes a plurality of second electrode bodies arranged in the second direction, any two adjacent first electrode bodies are connected to each other through a second bridge connector, any two adjacent second electrode bodies are connected to each other through a connecting piece, and the connecting piece and the second bridge connector cross each other and are insulated from each other.

In an embodiment, the first bridge connector and the second bridge connector are arranged in a same layer and are made of a same material, and the connecting piece, the first electrode bodies and the second electrode bodies are arranged in a same layer and are made of a same material.

In an embodiment, each of the plurality of first signal lines and the plurality of second signal lines includes a first transmission component and a second transmission component stacked on each other, the first transmission component is located between the second transmission component and the flexible substrate, and the first transmission component, the first electrode bodies and the second electrode bodies are arranged in a same layer and are made of a same material.

In an embodiment, the two edges of each of the notches are straight lines, and form an angle less than or equal to 90° therebetween.

In an embodiment, the first bridge connector and the second signal line crossing the first bridge connector are insulated from each other through a first insulating block.

In an embodiment, a size of the first insulating block in the second direction is not greater than a size of each of the first electrode bodies in the second direction, and two ends of the first bridge connector extend beyond first insulating block in the first direction.

In an embodiment, the connecting piece and the second bridge connector are insulated from each other through a second insulating block.

In an embodiment, a size of the second insulating block in the second direction is greater than a size of the second bridge connector in the second direction, and two ends of the second bridge connector extend beyond the second insulating block in the first direction.

In an embodiment, the flexible touch substrate further includes a protection layer covering the plurality of first electrodes, the plurality of second electrodes, the plurality of first signal lines and the plurality of second signal lines.

Another aspect of the present disclosure provides a touch device, which includes a flexible touch substrate and a cover plate attached to the flexible touch substrate, wherein the flexible touch substrate is the flexible touch substrate according to any one of the foregoing embodiments of the present disclosure.

In an embodiment, the flexible touch substrate includes a central touch region and a plurality of peripheral touch regions located outside of the central touch region, an extension of the central touch region towards any one of the plurality of sides of the flexible touch substrate does not overlap each of the notches, and the central touch region and the plurality of peripheral touch regions of the flexible touch substrate are bent towards the cover plate; and the cover plate includes a central surface and a plurality of lateral surfaces, which cover the central touch region and the plurality of peripheral touch regions of the flexible touch substrate, respectively.

In an embodiment, the touch device further includes a display panel, wherein the display panel has a front surface and a back surface, which are perpendicular to a thickness direction of the display panel, and a plurality of lateral surfaces connecting the front surface and the back surface to each other, the central touch region is attached to the front surface of the display panel, the plurality of peripheral touch regions are attached to at least three of the plurality of lateral surfaces of the display panel, respectively, and the front surface and the lateral surfaces, which are attached to respective peripheral touch regions of the flexible touch substrate, of the display panel all have a touch function.

In an embodiment, an intersection point of the two edges of each notch is a vertex of the notch; and the central touch region is a polygonal region, the vertex of each notch is located at an intersection point of two adjacent sides of the central touch region, and the two edges of each notch are attached to each other and located at a connection position of adjacent two of the plurality of lateral surfaces of the display panel.

BRIEF DESCRIPTION OF THE DRAWINGS

The accompanying drawings, which are provided for better understanding of the present disclosure and constitute a part of the specification, are for the purpose of explaining the present disclosure, but are not intended to limit the present disclosure, wherein.

DETAILED DESCRIPTION

Exemplary embodiments of the present disclosure will be described in detail below with reference to the accompanying drawings. It should be noted that, the embodiments described herein are only for the purpose of explaining and illustrating the present disclosure, but are not intended to limit the present disclosure.

The inventors of the present disclosure found that, the touch function of an existing touch device is usually provided on its light exit surface (e.g., the surface on which the touch device displays information when it is operating normally) only. Thus, when a user touches the light exit surface of the touch device, a portion of the information being displayed may be blocked and cannot be seen. Further, when the user holds the touch device (e.g., a smart phone or the like) with one hand, it may be inconvenient for the hand holding the touch device to touch the light exit surface of the touch device. Therefore, it is desirable to increase a touch region of the touch device to increase a screen-to-body ratio of the touch device, such that the user can interact with the touch device agilely and conveniently. The screen-to-body ratio may refer to a ratio of areas of surfaces having the touch function to an area of the entire outer surface of the touch device.

Figure 1:
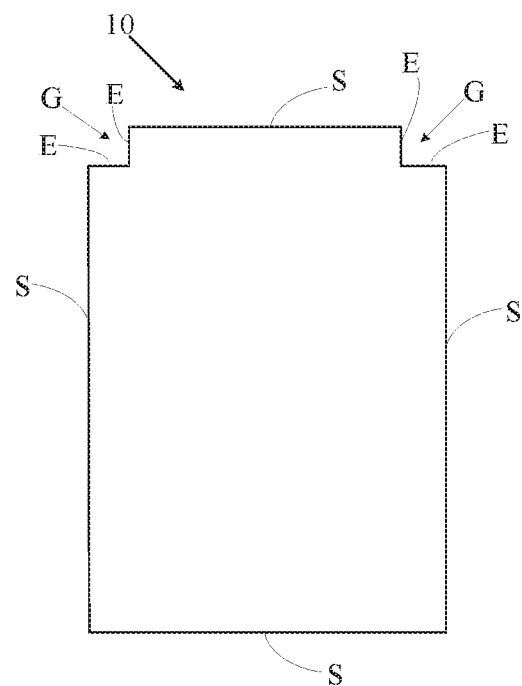
FIG. 1 is a schematic diagram showing a structure of a flexible touch substrate, in an unfolded state, according to an embodiment of the present disclosure.

FIG. 1 is a schematic diagram showing a structure of a flexible touch substrate, in an unfolded state, according to an embodiment of the present disclosure. As shown in FIG. 1, a flexible touch substrate 10, in the unfolded state, for example, includes a plurality of sides S. Each of at least one of the plurality of sides S has notches G at its both ends (e.g., two notches G located at both ends of an upper side S, respectively), and each of the notches G has two edges E whose extension directions cross each other. It should be noted that, the extension direction of each edge E of each notch G refers to the overall extension direction of the edge E, and may be a straight line, a curved line, or the like.

Figure 2:
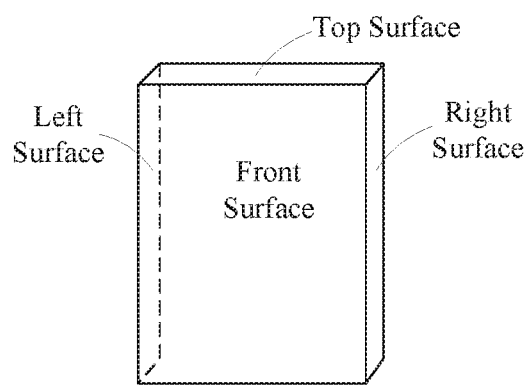
FIG. 2 is a schematic diagram of a three-dimensional structure obtained by bending the flexible touch substrate shown in FIG. 1.

Taking the flexible touch substrate 10 shown in FIG. 1 as an example, the flexible touch substrate 10 has four sides S which are of the upper side S, the lower side S, the left side S, and the right side S. For example, two notches G are formed at the two ends of the upper side S, respectively, and an intersection point of the two edges E of each of the notches G is a vertex of the notch G. In this case, the flexible touch substrate 10 may be bent along a line (e.g., the line L3 shown in FIG. 13) connecting vertexes of the two notches G together, along a fold line (e.g., the line L1 shown in FIG. 13) passing through the vertex of the left notch G and parallel to the left side S, and along a fold line (e.g., the line L2 shown in FIG. 13) passing through the vertex of the right notch G and parallel to the right side S, so as to obtain a three-dimensional structure as shown in FIG. 2. It should be noted that, the bending along the line L1, the bending along the line L2, and the bending along the line L3 are generally performed in the same direction (e.g., the direction perpendicular to the plane shown in FIG. 1 or 13 and close to or away from a viewer). As shown in FIG. 2, the front surface and three lateral surfaces (the top surface, the left surface, and the right surface) of the three-dimensional structure may all have touch functions, thereby increasing the screen-to-body ratio of a touch device including the flexible touch substrate 10. It should be understood that, in a case where the number of notches G is increased, the number of lateral surfaces of the three-dimensional structure that have touch functions may be increased. For example, in a case where two notches G are formed at both ends of the lower side S shown in FIG. 1, respectively, the bottom surface of the flexible touch substrate shown in FIG. 2 may also have a touch function.

For example, the shapes of the two edges E of each notch G match to each other (e.g., the lengths of the two edges E are equal to each other and have a conformal shape), such that the two edges E of each notch G are attached to each other (e.g., aligned with each other and/or closely connected to each other) by bending the flexible touch substrate 10, thereby ensuring that the widths of any adjacent two lateral surfaces are equal to each other after the flexible touch substrate 10 is bent. For example, the two edges E of each notch G may be straight lines, and an angle between the two edges E is less than or equal to 90°. For example, the two edges E of each notch G may be perpendicular to each other. For example, all of the notches G formed may be squares of which the sides have the same length.

Further, the side S (e.g., the upper side S shown in FIG. 1) having the notches G formed at its both ends is parallel to the line (e.g., the line L3 shown in FIG. 13) connecting the vertexes of the notches G, such that after the flexible touch substrate 10 is bent to form the three-dimensional structure shown in FIG. 2, the widths of the left and right ends of the top surface of the three-dimensional structure are equal to each other.

Figure 3:
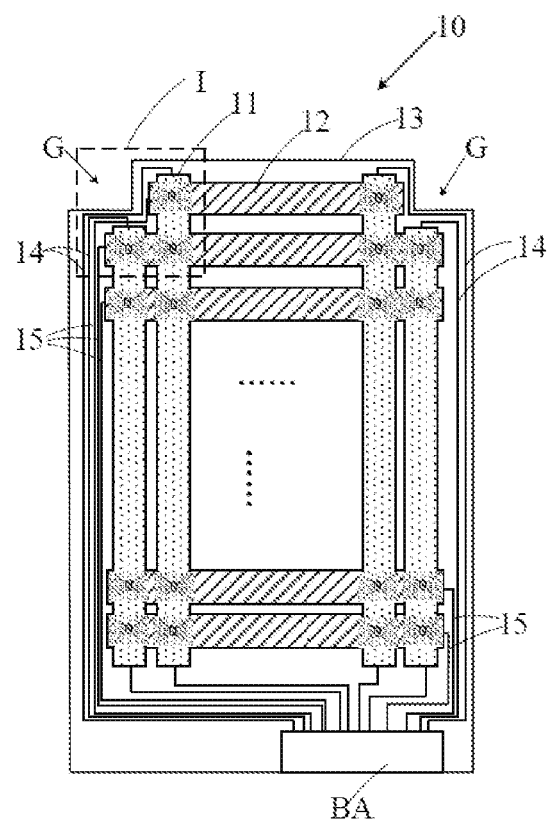
FIG. 3 is a schematic diagram showing a structure of a flexible touch substrate according to an embodiment of the present disclosure.

FIG. 3 is a schematic diagram showing a structure of a flexible touch substrate according to an embodiment of the present disclosure. As shown in FIG. 3, the flexible touch substrate 10 may include a flexible substrate 13 and a plurality of first electrodes 11 and a plurality of second electrodes 12 provided on the flexible substrate 13. The plurality of first electrodes 11 may extend in a first direction (e.g., the vertical direction in FIG. 3, which may be perpendicular to the upper side of the flexible touch substrate shown in FIG. 3), the plurality of second electrodes 12 may extend in a second direction (e.g., the horizontal direction in FIG. 3) crossing the first direction. The plurality of first electrodes 11 are insulated from the plurality of second electrodes 12. For example, of each of the first electrodes 11 and each of the second electrodes 12, one is a touch driving electrode, and the other is a touch sensing electrode. At least one of the first electrodes 11 at least partially overlaps each notch G in the first direction, and at least one of the second electrodes 12 at least partially overlaps at least one of the notches G in the second direction. It should be noted that, "at least one of the first electrodes 11 at least partially overlaps each notch G in the first direction" may mean that an orthographic projection of the at least one of the first electrodes 11 on a first straight line perpendicular to the first direction at least partially overlaps an orthographic projection of the corresponding notch G on the first straight lines (in other words, in a case where the at least one of the first electrodes 11 extends along the first direction towards the corresponding notch G, the at least one of the first electrodes 11 will pass through at least a portion of the corresponding notch G). Similarly, "at least one of the second electrodes 12 at least partially overlaps at least one of the notches G in the second direction" may mean that, an orthographic projection of the at least one of the second electrodes 12 on a second straight line perpendicular to the second direction at least partially overlaps an orthographic projection of the at least one of the notches G on the second straight line (in other words, in a case where the at least one of the second electrodes 12 extends along the second direction towards the at least one of the notches G, the at least one of the second electrodes 12 will pass through at least a portion of the at least one of the notches G). Thus, after the flexible touch substrate 10 is bent into the three-dimensional structure, each lateral surface of the three-dimensional structure has touch electrodes provided thereon. In an embodiment, in the second direction, the outermost first electrode 11 relative to each side of the flexible substrate 13 is arranged to be flush with the side or inside the side, and in a case where the outermost first electrode 11 is arranged to be inside the side, a distance between the side and an outer side of the outermost first electrode 11 is smaller than a length of each of the edges E of the notch G at an end of the side. Further, in the first direction, the outermost second electrode 12 relative to each side of the flexible substrate 13 is arranged to be flush with the side or inside the side, and in a case where the outermost second electrode 12 is arranged to be inside the side, a distance between the side and an outer side of the outermost second electrode 12 is smaller than a length of each of the edges E of the notch G at an end of the side. For example, in the second direction, the outermost first electrode 11 relative to the left side of the flexible substrate 13 is arranged to be flush with the left side or inside the left side, and in a case where the outermost first electrode 11 is arranged to be inside the left side, a distance between the left side and an outer side of the outermost first electrode 11 is smaller than a length of each of the edges E of the notch G at the upper end of the left side. In the first direction, the outermost second electrode 12 relative to the upper side of the flexible substrate 13 is arranged to be flush with the upper side or inside the upper side, and in a case where the outermost second electrode 12 is arranged to be inside the upper side, a distance between the upper side and an outer side of the outermost second electrode 12 is smaller than a length of each of the edges E of the notch G at the left (or right) end of the upper side.

Further, a plurality of signal lines are provided on the flexible substrate 13, and the plurality of signal lines include a plurality of first signal lines 14 and a plurality of second signal lines 15. Each of the plurality of first electrodes 11 is connected to one of the plurality of first signal lines 14, and each of the plurality of second electrodes 12 is connected to one of the plurality of second signal lines 15. The plurality of first signal lines 14 may be insulated from the plurality of second signal lines 15. The plurality of first signal lines 14 and the plurality of second signal lines 15 may be configured to connect the plurality of first electrodes 11 and the plurality of second electrodes 12 to a bonding area BA, respectively, and the bonding area BA may be provided or bonded with a touch driving circuit. For example, a portion of the first signal lines 14 may be connected to first ends of the corresponding first electrodes 11, and the other portion of the first signal lines 14 may be connected to second ends of the corresponding first electrodes 11. A portion of the second signal lines 15 may be connected to first ends of the corresponding second electrodes 12, and the other portion of the second signal lines 15 may be connected to second ends of the corresponding second electrodes 12. Alternatively, all of the first signal lines 14 may be connected to the first ends of the corresponding first electrodes 11, and all of the second signal lines 15 may be connected to the first ends of the corresponding second electrodes 12.

Figure 4:
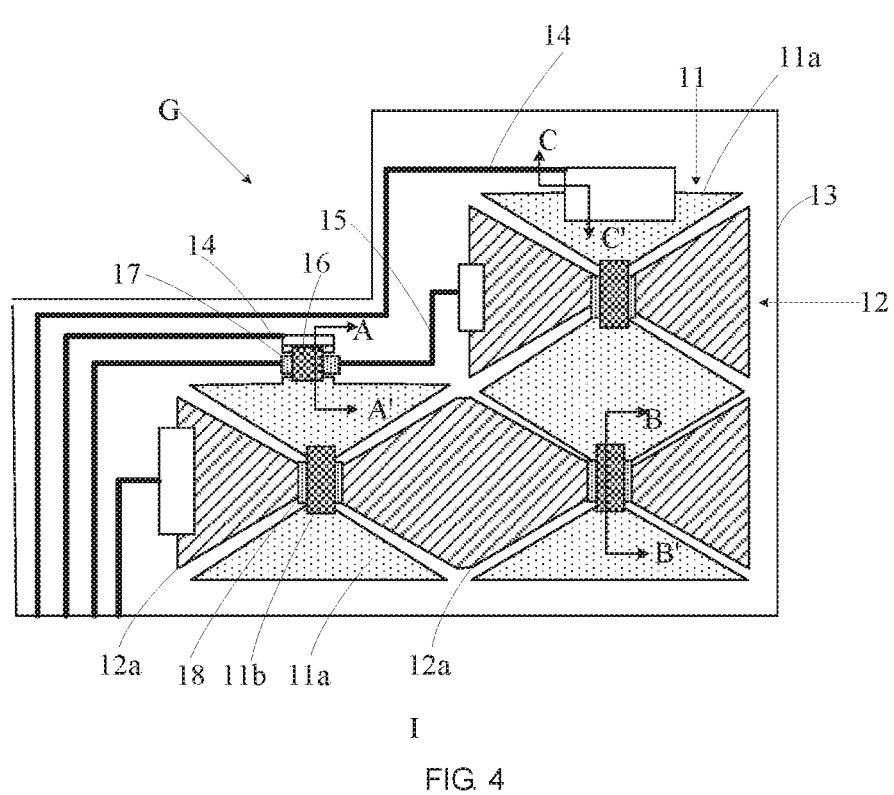
FIG. 4 is a schematic diagram showing a structure of region I of the flexible touch substrate shown in FIG. 3.
Figure 5:
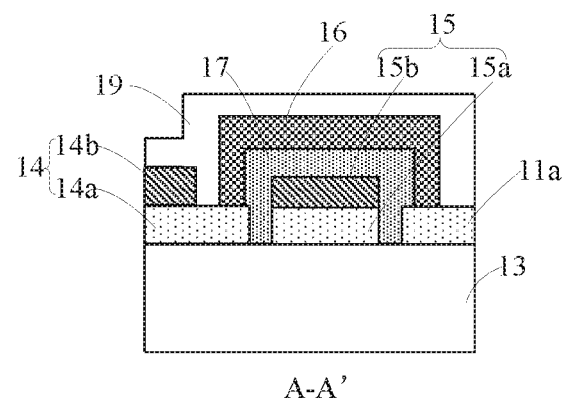
FIG. 5 is a schematic sectional view of the flexible touch substrate shown in FIG. 4 taken along line A-A' in FIG. 4.

FIG. 4 is a schematic diagram showing a structure of region I of the flexible touch substrate shown in FIG. 3 and FIG. 5 is a schematic sectional view of the flexible touch substrate shown in FIG. 4 taken along line A-A' in FIG. 4. As shown in FIGS. 3 to 5, a portion of the plurality of second signal lines 15 are located between the first electrode 11 at least partially overlapping at least one of the notches G in the first direction and the first signal line 14 corresponding to the first electrode 11. In this case, the first electrode 11 at least partially overlapping the at least one of the notches G in the first direction and the corresponding first signal line 14 are connected to each other through a first bridge connector 16, and the first bridge connector 16 is insulated from a corresponding second signal line 15 through an insulating block 17, thereby ensuring that each first signal line 14 is insulated from all of the second signal lines 15.

For example, the second signal line 15 located between the first electrode 11 at least partially overlapping one of the notches G (e.g., the notch G shown in FIG. 4 or the left notch G shown in FIG. 3) in the first direction and the first signal line 14 corresponding to the first electrode 11 may include the second signal line 15 connected to the second electrode 12 at least partially overlapping the one of the notches G in the second direction (e.g., the second electrode 12 at the right side of the notch G shown in FIG. 4). Thus, the first signal lines 14 may be arranged to have centralized distribution, and the second signal lines 15 may be arranged to have centralized distribution, thereby reducing or avoiding the capacitance generated by the alternate arrangement of the first signal lines 14 and the second signal lines 15. As a result, a size of the touch capacitance generated between the first electrodes 11 and the second electrodes 12 is prevented from being changed.

Figure 6:
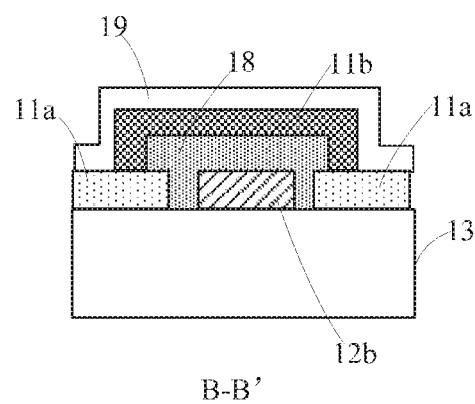
FIG. 6 is a schematic sectional view of the flexible touch substrate shown in FIG. 4 taken along line B-B' in FIG. 4.

FIG. 6 is a schematic sectional view of the flexible touch substrate shown in FIG. 4 taken along line B-B' in FIG. 4. As shown in FIGS. 4 and 6, each of the first electrodes 11 includes a plurality of first electrode bodies 11a arranged in the first direction, and each of the second electrodes 12 includes a plurality of second electrode bodies 12a arranged in the second direction. Any two adjacent first electrode bodies 11a are connected to each other through a second bridge connector 11b, and any two adjacent second electrode bodies 12a are connected to each other through a connecting piece 12b. The connecting piece 12b and the second bridge connector 11b may cross each other and may be insulated from each other through an insulating block 18. For example, the connecting piece 12b between any two adjacent second electrode bodies 12a may be a structure integrally formed with one of the two adjacent second electrode bodies 12a, or may be a structure formed separately from the two adjacent second electrode bodies 12a.

For example, the first bridge connector 16 and the second bridge connector 11b may be arranged in a same layer and formed of a same material, and the connecting piece 12b, the first electrode bodies 11a, and the second electrode bodies 12a may be arranged in a same layer and formed of a same material. For example, the statement "arranged in a same layer" herein may mean that two structures are formed by performing a same patterning process on a same material layer, but does not necessarily mean that the two structures have a same distance from the flexible substrate 13. In an embodiment of the present disclosure, during the manufacturing process of the flexible touch substrate 10, the first bridge connectors 16 and the second bridge connectors 11b may be formed simultaneously (e.g., by a same patterning process), and the connecting pieces 12b, the first electrode bodies 11a, and the second electrode bodies 12a may be formed simultaneously (e.g., by a same patterning process), thereby simplifying the manufacturing process thereof.

For example, the first electrode bodies 11a, the second electrode bodies 12a, the connecting pieces 12b, the first bridge connectors 16 and the second bridge connectors 11b may be made of a transparent conductive material such as indium tin oxide (ITO), such that in a case where the flexible touch substrate is applied to a display device, the first electrode bodies 11a, the second electrode bodies 12a, the connecting pieces 12b, the first bridge connectors 16 and the second bridge connectors 11b may not block the displayed screen. Alternatively, the first bridge connectors 16 and the second bridge connectors 11b may be made of a metal material, and the metal material may have a high light transmittance in a case where the metal material is thin enough.

In the present embodiment, both each of the insulating blocks 17 and each of the insulating blocks 18 may be small blocks. For example, a size of each insulating block 17 in the second direction is not greater than a size of each first electrode body 11a in the second direction, and two ends of each first bridge connector 16 extend in the first direction beyond the corresponding insulating block 17 to connect each first electrode 11 to the corresponding first signal line 14. A size of each insulating block 18 in the second direction is greater than a size of each second bridge connector 11b in the second direction, and two ends of each second bridge connector 11b extend in the first direction beyond the corresponding insulating block 18 to connect two adjacent first electrode bodies 11a to each other.

Figure 7:
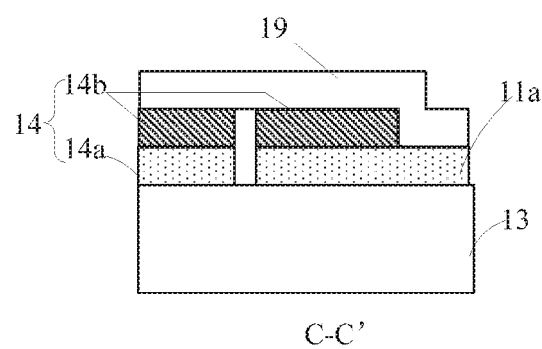
FIG. 7 is a schematic sectional view of the flexible touch substrate shown in FIG. 4 taken along line C-C' in FIG. 4.

FIG. 7 is a schematic sectional view of the flexible touch substrate shown in FIG. 4 taken along line C-C' in FIG. 4. As shown in FIGS. 4, 5 and 7, each of the signal lines may have a double-layer structure, so as to have a decreased resistance. For example, each of the plurality of first signal lines 14 includes a first transmission component 14a and a second transmission component 14b stacked on each other, and the first transmission component 14a is located between the second transmission component 14b and the flexible substrate 13. Each of the plurality of second signal lines 15 includes a first transmission component 15a and a second transmission component 15b stacked on each other, and the first transmission component 15a is located between the second transmission component 15b and the flexible substrate 13.

For example, the first transmission components 14a and 15a, the first electrode bodies 11a, and the second electrode bodies 12a may be arranged in a same layer and made of a same material (e.g., a transparent conductive material). The second transmission components 14b and 15b may be made of a metal material. In a case where the first bridge connectors 16 and the second bridge connectors 11b are made of a metal material, the second transmission components 14b and 15b, the first bridge connectors 16, and the second bridge connectors 11b may be arranged in a same layer and made of a same material.

Further, as shown in FIGS. 5 to 7, a protection layer 19 may be provided on the flexible substrate 13, and the protection layer 19 may cover the first electrodes 11, the second electrodes 12, the first signal lines 14, and the second signal lines 15, so as to protect the first electrodes 11, the second electrodes 12, the first signal lines 14, and the second signal lines 15 from erosion of the external environment. For example, the protection layer 19 may be made of an insulating material.

Figure 8:
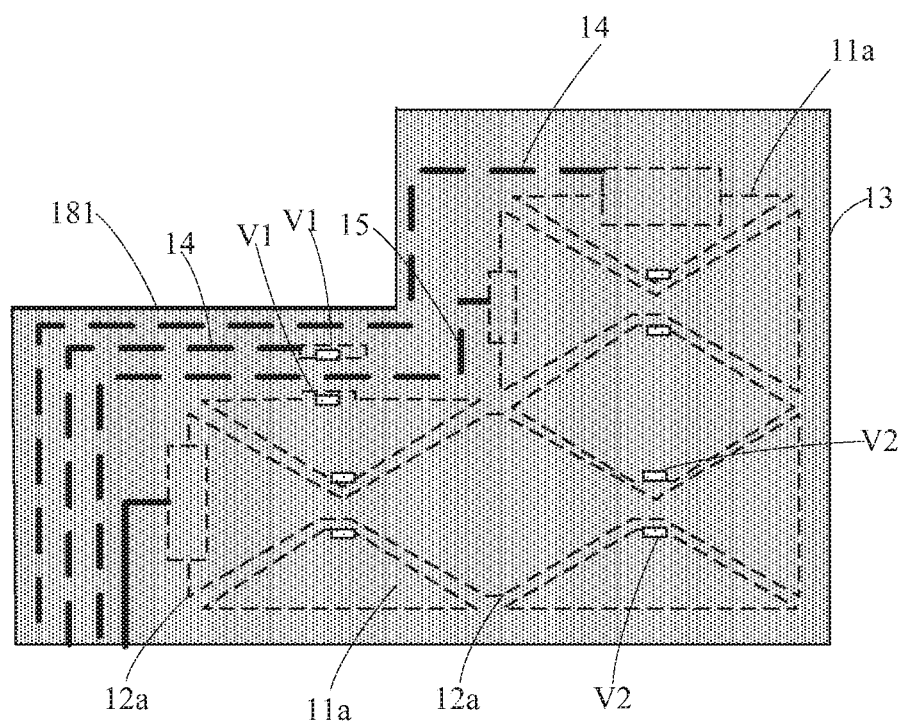
FIG. 8 is a schematic top view showing a structure under a layer in which a first bridge connector is located, in a flexible touch substrate according to an embodiment of the present disclosure.
Figure 9:
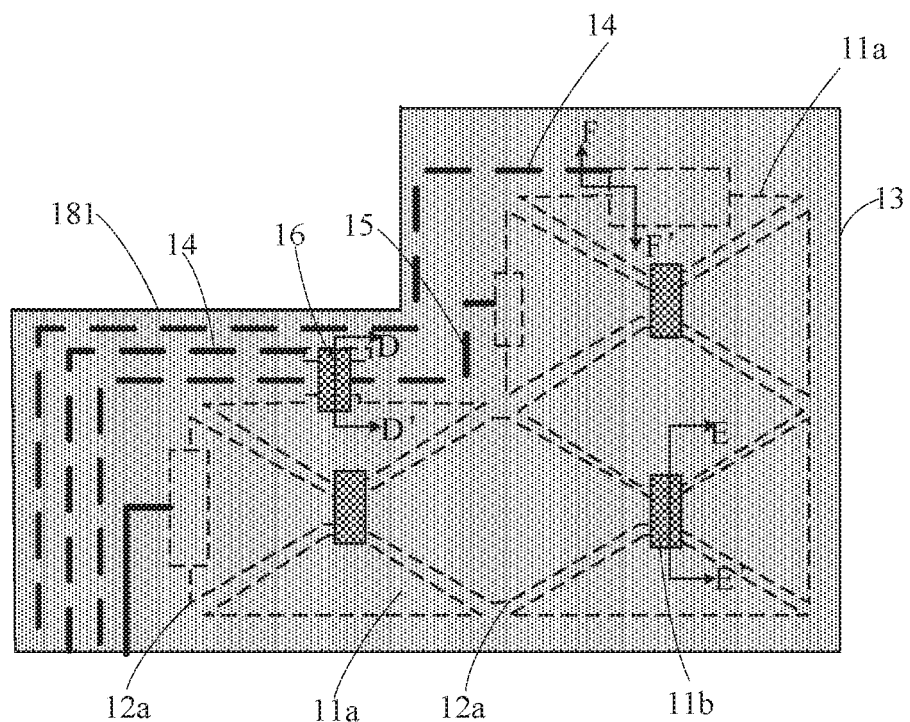
FIG. 9 is a schematic top view showing a structure of a flexible touch substrate, in which a first bridge connector has been formed, according to an embodiment of the present disclosure.
Figure 10:
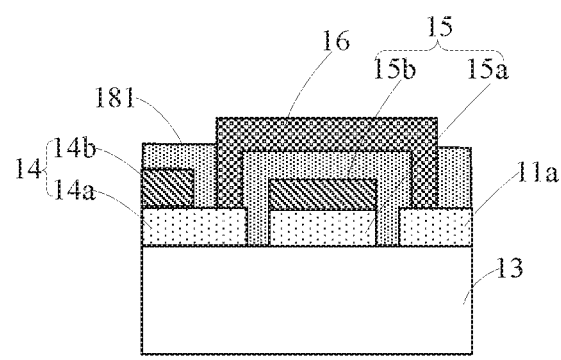
FIG. 10 is a schematic sectional view of the flexible touch substrate shown in FIG. 9 taken along line D-D' in FIG. 9.
Figure 11:
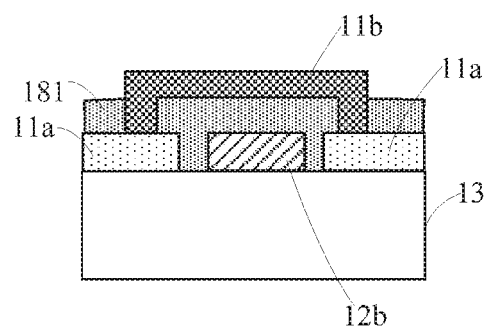
FIG. 11 is a schematic sectional view of the flexible touch substrate shown in FIG. 9 taken along line E-E' in FIG. 9.
Figure 12:
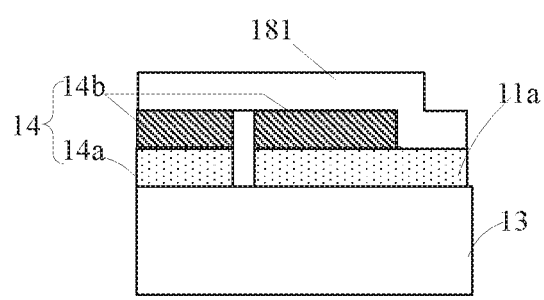
FIG. 12 is a schematic sectional view of the flexible touch substrate shown in FIG. 9 taken along line F-F' in FIG. 9.

FIG. 8 is a schematic top view showing a structure under a layer in which the first bridge connectors 16 are located, in a flexible touch substrate according to an embodiment of the present disclosure, and FIG. 9 is a schematic top view showing a structure of a flexible touch substrate, in which the first bridge connectors 16 have been formed, according to an embodiment of the present disclosure. FIG. 10 is a schematic sectional view of the flexible touch substrate shown in FIG. 9 taken along line D-D' in FIG. 9, and FIG. 11 is a schematic sectional view of the flexible touch substrate shown in FIG. 9 taken along line E-E' in FIG. 9. FIG. 12 is a schematic sectional view of the flexible touch substrate shown in FIG. 9 taken along line F-F' in FIG. 9. For example, in FIGS. 8 and 9, a structure under an insulating layer 181 is illustrated by dashed lines. As shown in FIGS. 4 to 12, in the present embodiment, the insulating layer 181, which is continuous, may be provided on the first electrodes 11 and the second electrodes 12, and the first bridge connectors 16, the second bridge connectors 11b, and the like may be provided on the insulating layer 181. Each of the first bridge connectors 16 connects a first electrode body 11a of each first electrode 11 to the corresponding first signal line 14 through a first via V1 formed in the insulating layer 181, and each of the second bridge connectors 11b connects two adjacent first electrode bodies 11a to each other through a second via V2 formed in the insulating layer 181. In this case, the insulating blocks 17 and the insulating blocks 18 shown in FIGS. 4 to 6 may be portions of the insulating layer 181.

Further, a layer in which the first bridge connectors 16 are located may or may not have a protection layer (e.g., the protection layer 19 shown in FIGS. 5 to 7) provided thereon.

Other structures of the flexible touch substrate of the present embodiment are the same as those of the embodiments as shown in FIGS. 1 to 7, and detailed description thereof is omitted here.

An embodiment of the present disclosure provides a touch device, which includes the flexible touch substrate 10 as described above and a cover plate attached to the flexible touch substrate 10. It should be noted that, the cover plate may have a structure similar to the three-dimensional structure shown in FIG. 2. That is, the cover plate may have a central surface and a plurality of lateral surfaces. In a case where the cover plate is arranged opposite to the three-dimensional structure shown in FIG. 2, the central surface and the plurality of lateral surfaces of the cover plate may cover the front surface and the lateral surfaces of the three-dimensional structure shown in FIG. 2. For example, the cover plate may be made of glass.

The touch device may be configured to have a touch function only. In this case, the flexible touch substrate 10 may be bent such that the two edges E of each notch G are attached to each other, thereby obtaining a touch device of which the front surface and at least three lateral surfaces have touch functions.

Figure 14:
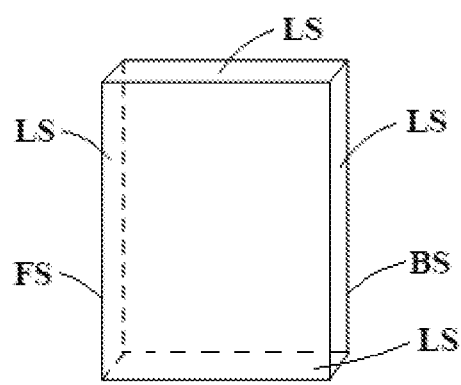
FIG. 14 is a schematic perspective view showing a structure of a display panel according to an embodiment of the present disclosure.

To make the touch device further have a display function, for example, the touch device may further include a display panel. The display panel has a front surface FS and a back surface BS, which are perpendicular to a thickness direction of the display panel, and a plurality of (e.g., four) lateral surfaces LS connecting the front surface FS and the back surface BS to each other, as shown in FIG. 14. For example, the display panel may be a liquid crystal display panel or an organic light emitting diode (OLED) display panel. For example, the flexible touch substrate 10 of the touch device may be attached to the display panel, such that the top surface, the left surface and the right surface of the flexible touch substrate 10 are attached to three of the plurality of lateral surfaces LS of the display panel, respectively.

Figure 13:
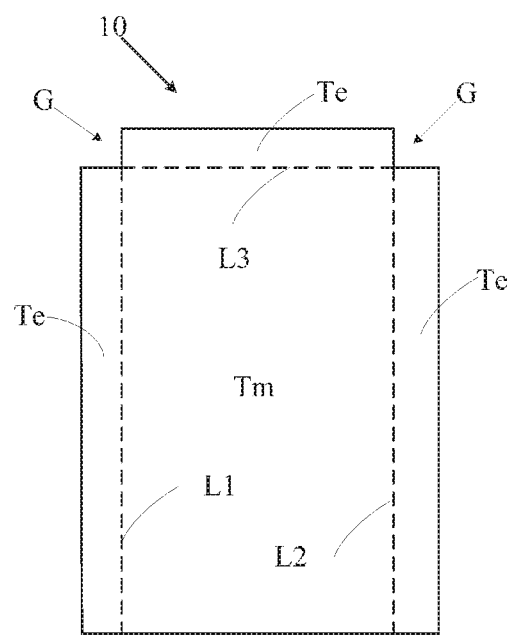
FIG. 13 is a schematic diagram showing regions divided from a flexible touch substrate according to an embodiment of the present disclosure.

FIG. 13 is a schematic diagram showing regions divided from a flexible touch substrate according to an embodiment of the present disclosure. As shown in FIG. 13, the flexible touch substrate 10 may be divided into a central touch region Tm and a plurality of peripheral touch regions Te located outside of the central touch region Tm. The peripheral touch regions Te may have a touch function achieved by the first electrodes 11 and/or the second electrodes 12 arranged therein, respectively. An extension of the central touch region Tm towards any one of the plurality of sides (e.g., upwards, leftwards, or rightwards in FIG. 13) of the flexible touch substrate 10 does not overlap each of the notches G The central touch region Tm may be attached to the front surface FS of the display panel, and the peripheral touch regions Te may be attached to at least three of the plurality of lateral surfaces LS of the display panel. The peripheral touch regions Te may include a top peripheral touch region Te, a left peripheral touch region Te and a right peripheral touch region Te corresponding to the top surface, the left surface and the right surface of the flexible touch substrate 10 shown in FIG. 2, respectively. The front surface FS and the lateral surfaces LS, which are attached to the peripheral touch regions Te of the flexible touch substrate 10, respectively, of the display panel may all have touch functions. For example, the front surface FS of the display panel may be a surface perpendicular to the thickness direction of the display panel and capable of emitting light.

In an embodiment, the central touch region Tm is a polygonal region, for example, when being viewed in a plan view. The vertex of each notch G is located at an intersection point of two adjacent sides (i.e., a vertex) of the central touch region Tm, and the two edges of the notch G are attached to each other and located at a connection position of adjacent two of the plurality of lateral surfaces LS of display panel, thereby making the front surface and at least three of the lateral surfaces of a resultant touch device form a continuous touch surface.

In the present embodiment, the front surface and at least three of the lateral surfaces of the resultant touch device all have touch functions, thereby increasing the screen-to-body ratio of the touch device.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A flexible touch substrate, comprising a plurality of sides, wherein each of at least one of the plurality of sides has notches at both ends, each of the notches has two edges whose extension directions cross each other, and the two edges of each of the notches have a same length, wherein edges of two notches at both ends of a same one of the plurality of sides have a same length, wherein the flexible touch substrate further comprises:

a flexible substrate; and a plurality of first electrodes and a plurality of second electrodes on the flexible substrate, wherein: the plurality of first electrodes extend in a first direction, the plurality of second electrodes extend in a second direction perpendicular to the first direction, the plurality of first electrodes are insulated from the plurality of second electrodes, and the first direction is perpendicular to the side whose both ends have the two notches, respectively;

in the second direction, a distance between an outer side of the outermost first electrode relative to each side of the flexible substrate and the side of the flexible substrate is smaller than a length of each of the edges of the notch at an end of the side of the flexible substrate; and in the first direction, a distance between an outer side of the outermost second electrode relative to each side of the flexible substrate and the side of the flexible substrate is smaller than a length of each of the edges of the notch at an end of the side of the flexible substrate, wherein the flexible touch substrate further comprises a plurality of signal lines on the flexible substrate, wherein the plurality of signal lines comprise a plurality of first signal lines and a plurality of second signal lines, each of the plurality of first electrode is connected to one of the plurality of first signal lines, each of the plurality of second electrodes is connected to one of the plurality of second signal lines, and the plurality of first signal lines an insulated from the plurality of second signal lines, and wherein a portion of the plurality of second signal lines are located between the first electrode at least partially overlapping at least one of the notches in the first direction and the first signal line corresponding to the first electrode, the first electrode at least partially overlapping at least one of the notches in the first direction and the corresponding first signal line are connected to each other through a first bridge connector, and the first bridge connector is insulated from the second signal line crossing the first bridge connector.

2. The flexible touch substrate according to claim 1, wherein each of the first electrodes comprises a plurality of first electrode bodies arranged in the first direction, each of the second electrodes comprises a plurality of second electrode bodies arranged in the second direction, any two adjacent first electrode bodies are connected to each other through a second bridge connector, any two adjacent second electrode bodies are connected to each other through a connecting piece, and the connecting piece and the second bridge connector cross each other and are insulated from each other.

3. The flexible touch substrate according to claim 2, wherein the first bridge connector and the second bridge connector are arranged in a same layer and are made of a same material, and the connecting piece, the first electrode bodies and the second electrode bodies are arranged in a same layer and are made of a same material.

4. The flexible touch substrate according to claim 2, wherein each of the plurality of first signal lines and the plurality of second signal lines comprises a first transmission component and a second transmission component stacked on each other, the first transmission component is located between the second transmission component and the flexible substrate, and the first transmission component, the first electrode bodies and the second electrode bodies are arranged in a same layer and are made of a same material.

5. The flexible touch substrate according to claim 2, wherein the first bridge connector and the second signal line crossing the first bridge connector are insulated from each other through a first insulating block.

6. The flexible touch substrate according to claim 5, wherein a size of the fi insulating block in the second direction is not greater than a size of each of the first electrode bodies in the second direction, and two ends of the first bridge connector extend beyond the first insulating block in the first direction.

7. The flexible touch substrate according to claim 2, wherein the connecting piece and the second bridge connector are insulated from each other through a second insulating block.

8. The flexible touch substrate according to claim 7, wherein a size of the second insulating block in the second direction is greater than a size of the second bridge connector in the second direction, and two ends of the second bridge connector extend beyond the second insulating block in the first direction.

9. The flexible touch substrate according to claim 1, wherein the two edges of each of the notches are straight lines, and form an angle less than or equal to 90° therebetween.

10. The flexible touch substrate according to claim 1, further comprising a protection layer covering the plurality of first electrodes, the plurality of second electrodes, the plurality of first signal lines and the plurality of second signal lines.

11. A touch device, comprising a flexible touch substrate and a cover plate attached to the flexible touch substrate, wherein the flexible touch substrate is the flexible touch substrate according to claim 1.

12. The touch device according to claim 11, wherein: the flexible touch substrate comprises a central touch region and a plurality of peripheral touch regions located outside of the central touch region, an extension of the central touch region towards any one of the plurality of sides of the flexible touch substrate does not overlap each of the notches, and the central touch region and the plurality of peripheral touch regions of the flexible touch substrate are bent towards the cover plate; and the cover plate comprises a central surface and a plurality of lateral surfaces, which cover the central touch region and the plurality of peripheral touch regions of the flexible touch substrate, respectively.

13. The touch device according to claim 12, further comprising a display panel, wherein the display panel has a front surface and a back surface, which are perpendicular to a thickness direction of the display panel, and a plurality of lateral surfaces connecting the front surface and the back surface to each other, the central touch region is attached to the front surface of the display panel, the plurality of peripheral touch regions are attached to at least three of the plurality of lateral surfaces of the display panel, respectively, and the front surface and the lateral surfaces, which are attached to respective peripheral touch regions of the flexible touch substrate, of the display panel all have a touch function.

14. The touch device according to claim 13, wherein: an intersection point of the two edges of each notch is a vertex of the notch; and the central touch region is a polygonal region, the vertex of each notch is located at an intersection point of two adjacent sides of the central touch region, and the two edges of each notch are attached to each other and located at a connection position of adjacent two of the plurality of lateral surfaces of the display panel.

* * * * *